(No Model.)
A. C. MATHER.
RAILROAD TRUCK.
No. 575,723. Patented Jan. 26, 1897.
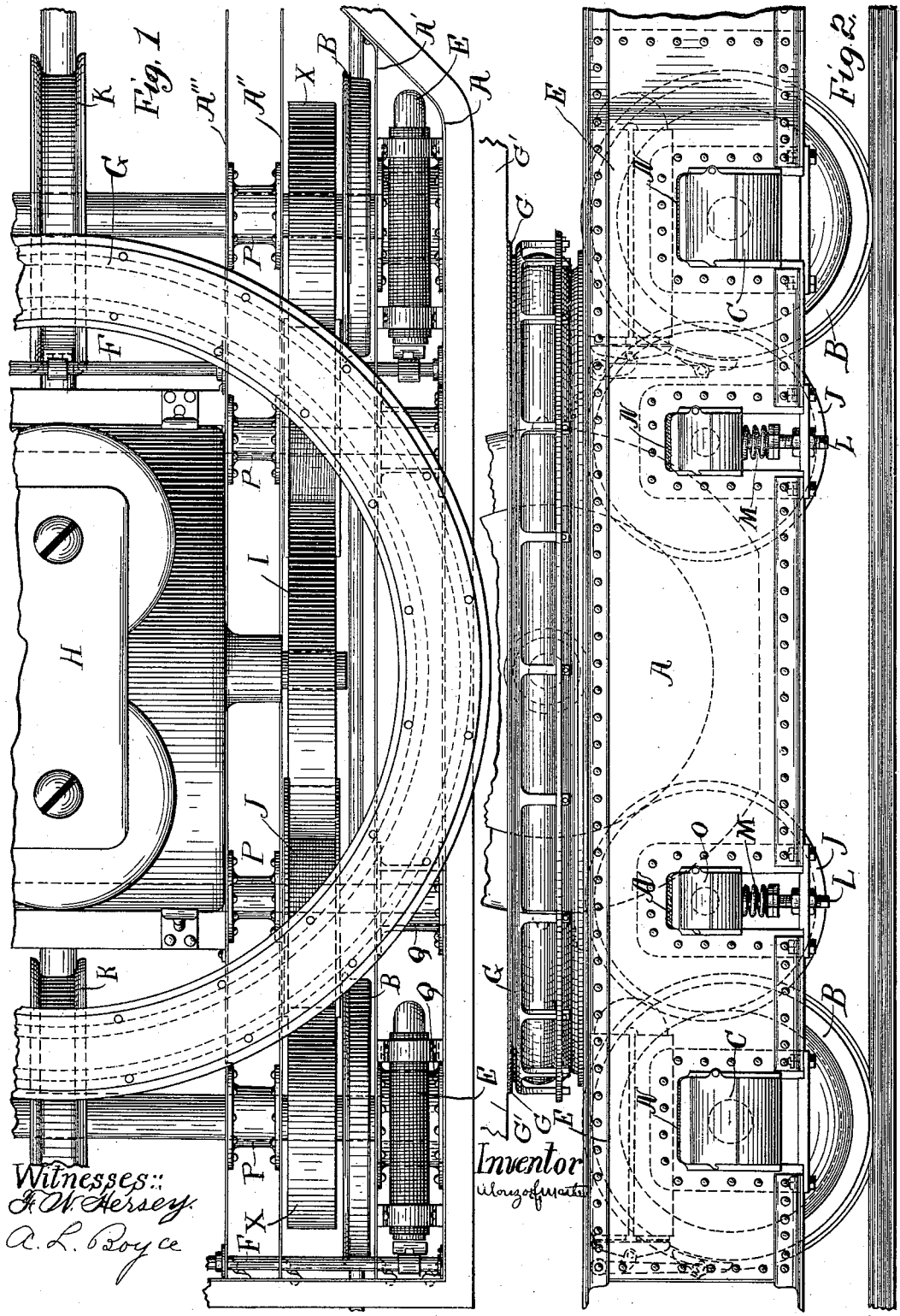
Witnesses:
F. W. Hersey
A. L. Boyce
Inventor
Alonzo C. Mather

ID PATENT OFFICE.

ALONZO C. MATHER, OF CHICAGO, ILLINOIS.

RAILROAD-TRUCK.

SPECIFICATION forming part of Letters Patent No. 575,723, dated January 26, 1897.

Application filed January 23, 1893. Serial No. 459,375. (No model.)

*To all whom it may concern:*

Be it known that I, ALONZO C. MATHER, a resident of Chicago, county of Cook, in the State of Illinois, have invented certain new and useful Improvements in Devices for Railroad-Trucks; and I do hereby declare the following to be a full, clear, and exact description of the invention, and such as will enable others skilled in the art to which it appertains to make use of the same.

My invention relates to an improvement in an iron or steel railroad-truck, the object being to construct a truck of as few parts as possible and at the same time to give great rigidity and stiffness and equally distribute the load of the car-body over the same, at the same time providing suitable construction to which the boxes and bearings can be securely applied. I accomplish this by arranging sheets of steel of suitable width and number to carry the load which the truck has to do horizontally with each other with their edges uppermost and running from the front to the rear of the truck. As will be seen, from this mode of construction I am enabled to provide suitable space between them for the journal-bearings and wheels, at the same time get the full strength of the metal at such places as it is required. The outside layer I stiffen with angle-irons, as shown. This truck is particularly adapted for electric railways, but I do not limit myself to them.

In the accompanying drawings, Figure 1 represents a plan view of my truck, half of which is broken away. Fig. 2 is a side elevation of the same.

A A' A" A'" represent the layers of steel, more or less of which may be used as required to give requisite strength.

B B are the wheels, C C the journal-boxes, and E E electric brakes, though air can be applied as well.

F is a brake-shaft turning in suitable bearing provided with arms, the longer ones having attached the brake-shoes, while the shorter ones are attracted by the electric magnets when a current is sent through them. As will be seen, by this arrangement I am enabled by a slight movement of short arms in front of the magnets to produce a long movement in the arm which carries the brake- shoe in proportion as the difference in the length between the two.

G G is the spring, which is the subject of another patent, and I do not limit myself to this particular spring.

H is the electric motor, projecting up into the car-body G'. I is the wheel on its shaft, meshing against the idler J and that against friction-wheels X X on the main axles.

K K is the driving-wheel, which is the subject of another patent and not in any way claimed in this.

L L are screws with which I regulate the pressure of the idler friction-wheel J between the motor and the wheels on the axle of the car.

M M are springs which keep the idler constantly pressed against the wheel of the motor and the friction-wheels on the axle.

N N are thin rubber springs over the boxes to avoid jarring the motor on the car.

As will be seen, in operation I get the power of the motor distributed equally to all wheels underneath the truck, and by the screws L, I can regulate the friction between the wheels and the motor in the truck just in proportion to the adhesion of the truck-wheels to the track, at the same time have elastic bed for my motor.

O represents the journal-box for the axle of the idler J. Q is a formed piece of steel placed between the sheets A A' of the truck, into which the journal-boxes C and O fit and which enables them to play up and down and to be removed as may be desired.

P is a formed piece of steel placed between the sheets A" and A'" for the purpose of making the plates more rigid and to stiffen them at the points where the axles pass through them.

This truck, as represented in the drawings, is made to operate by electricity, though I do not desire to claim this as the exclusive means of operation, as it may be run by steam or other power. In operating this truck the power is applied by means of electricity to the motor H, which in turn revolves the pulley or gear I, which is placed at each end of its armature-shaft. The motor is fastened to the truck by any suitable means. The power being applied to the gear I passes to the idler-gear J, and from there to the gear X, which is placed upon the driving-shaft of the truck. All of these gears are of the friction class and not toothed, as is so generally used in this class of work. In the operation of this system of gearing the idler-gear J plays an important part. It is placed so that its center comes a little below the line of the centers of the wheels X and I, and by means of the spring M and screw L is kept at a constant and heavy pressure against the two wheels X and I, thus enabling a perfect transmission of power by means of the friction-gear to each driving-axle of the truck. On this truck I use the electric brake, the novel feature being that the brake-shoe which works on the driving-wheel K is placed a little above the center, and by being so placed will cramp when power is applied by short movement of the armature in front of the brake's magnet.

The brake arrangement consists of a simple magnet held between the two plates A A' by means of a strap and a brake-rod F, having at the magnet ends an arrangement by which the power is applied to it, and in the center of the truck, over the main driving-wheel, is an arm with the brake-shoe on it. This mode of construction of a truck is especially adapted to cars running at a very high rate of speed, as it is very rigid and compact.

Having thus described my invention, what I claim as new, and desire to secure by Letters Patent, is—

1. A car-truck constructed of parallel plates of iron or steel, stiffened by angle-iron on their top and bottom edges, and castings between said plates for carrying the journal-boxes, the ends of the trucks being closed by plates of the same material, substantially as shown and described.

2. An electric-motor truck, having the motor mounted on top of the truck, and projecting into the car-body above it, and having connections and bearings between the truck and the car-body, said connections and bearings being continuous and encircling said motor, substantially as shown and described.

3. An electric-motor truck having the motor mounted on top and in the center of said truck, with the bearings and connections between the body of the car and the truck, said bearings and connections being continuous and surrounding said motor, and a train of wheels connecting from its armature-shaft to a suitable pinion on the axles of the wheels of the truck, substantially as shown and described.

ALONZO C. MATHER.

Witnesses:
FRED W. HERSEY,
ANNA L. BOYCE.